US010062981B2

(12) United States Patent
Muth et al.

(10) Patent No.: US 10,062,981 B2
(45) Date of Patent: Aug. 28, 2018

(54) GROUND ROUTING DEVICE AND METHOD

(71) Applicant: Intel Corporation, Santa Clara, CA (US)

(72) Inventors: Karlheinz Muth, Richardson, TX (US); Brent Rothermel, Pottstown, PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/024,904

(22) PCT Filed: Dec. 18, 2013

(86) PCT No.: PCT/US2013/076021
§ 371 (c)(1),
(2) Date: Mar. 25, 2016

(87) PCT Pub. No.: WO2015/094214
PCT Pub. Date: Jun. 25, 2015

(65) Prior Publication Data
US 2016/0218453 A1    Jul. 28, 2016

(51) Int. Cl.
H04B 10/40    (2013.01)
G02B 6/42     (2006.01)
H01R 12/52    (2011.01)
H01R 12/57    (2011.01)
H01R 13/6471  (2011.01)

(52) U.S. Cl.
CPC ........... H01R 12/526 (2013.01); G02B 6/428 (2013.01); G02B 6/4246 (2013.01); G02B 6/4257 (2013.01); H01R 12/57 (2013.01); H01R 13/6471 (2013.01); H04B 10/40 (2013.01)

(58) Field of Classification Search
None
See application file for complete search history.

(56) References Cited

U.S. PATENT DOCUMENTS

2003/0203660 A1    10/2003  Kassa et al.
2004/0085744 A1*   5/2004   Leeson ............... H05K 9/0058
                                              361/816
2007/0230149 A1    10/2007  Bibee
2009/0188711 A1    7/2009   Ahmad
(Continued)

FOREIGN PATENT DOCUMENTS

CN    1375872 A    10/2002
CN    1595797 A    3/2005
(Continued)

OTHER PUBLICATIONS

"International Application Serial No. PCT/US2013/076021, International Search Report dated Sep. 15, 2014", 3 pgs.
(Continued)

Primary Examiner — Darren E Wolf
(74) Attorney, Agent, or Firm — Schwegman Lundberg & Woessner, P.A.

(57) ABSTRACT

Electronic devices and associated methods are shown including a connector mounted to a printed circuit board (PCB). Examples shown include a number of ground vias passing through the PCB to a second side of the PCB, wherein the number of ground vias is smaller than a number of ground sites. Selected examples include an optoelectronic connector mounted using surface mount technology.

18 Claims, 6 Drawing Sheets

(56) References Cited

U.S. PATENT DOCUMENTS

| | | |
|---|---|---|
| 2010/0255690 A1 | 10/2010 | Waite et al. |
| 2013/0004120 A1 | 1/2013 | Zbinden et al. |
| 2013/0056253 A1 | 3/2013 | Biddle et al. |

FOREIGN PATENT DOCUMENTS

| | | |
|---|---|---|
| CN | 101112135 A | 1/2008 |
| CN | 103168396 A | 6/2013 |
| CN | 106463854 A | 2/2017 |
| JP | 09270484 A | 10/1997 |
| JP | 2002134868 A | 5/2002 |
| JP | 2005149854 A | 6/2005 |
| JP | 2006236953 A | 9/2006 |
| JP | 2011248243 A | 12/2011 |
| JP | 2013544447 A | 12/2013 |
| KR | 1020130057240 A | 5/2013 |
| WO | WO-2006056473 A2 | 6/2006 |
| WO | WO-2015094214 A1 | 6/2015 |

OTHER PUBLICATIONS

"International Application Serial No. PCT/US2013/076021, Written Opinion dated Sep. 15, 2014", 7 pgs.

"International Application Serial No. PCT/US2013/076021, International Preliminary Report on Patentability dated Jun. 30, 2016", 9 pgs.

"Japanese Application Serial No. 2016-526845, Office Action dated Jun. 20, 2017", W/ English Translation, 6 pgs.

"Chinese Application Serial No. 201380081027.1, Office Action dated Mar. 22, 2018", W/Concise Statement of Relevance, 9 pgs.

"European Application Serial No. 13899557.6, Extended European Search Report dated Jul. 27, 2017", 7 pgs.

"Chinese Application Serial No. 201380081027.1, Office Action dated Jun. 16, 2017", w/English Claims, 11 pgs.

"Korean Application Serial No. 10-2016-7012944, Response filed Jul. 24, 2017 to Office Action dated May 24, 2017", w/ English Claims, 23 pgs.

"Japanese Application Serial No. 2016-526845, Examiners Decision of Final Refusal dated Dec. 29, 2017", With English Translation, 5 pgs.

"Korean Application Serial No. 10-2016-7012944, Office Action dated Nov. 1, 2017", W/ English Translation, 4 pgs.

"Korean Application Serial No. 10-2016-7012944, Response filed Jan. 2, 2018 Office Action dated Nov. 1, 2017", w/ English Claims, 15 pgs.

"Korean Application Serial No. 10-2016-7012944, Office Action dated May 24, 2017", W/ English Translation, 10 pgs.

\* cited by examiner

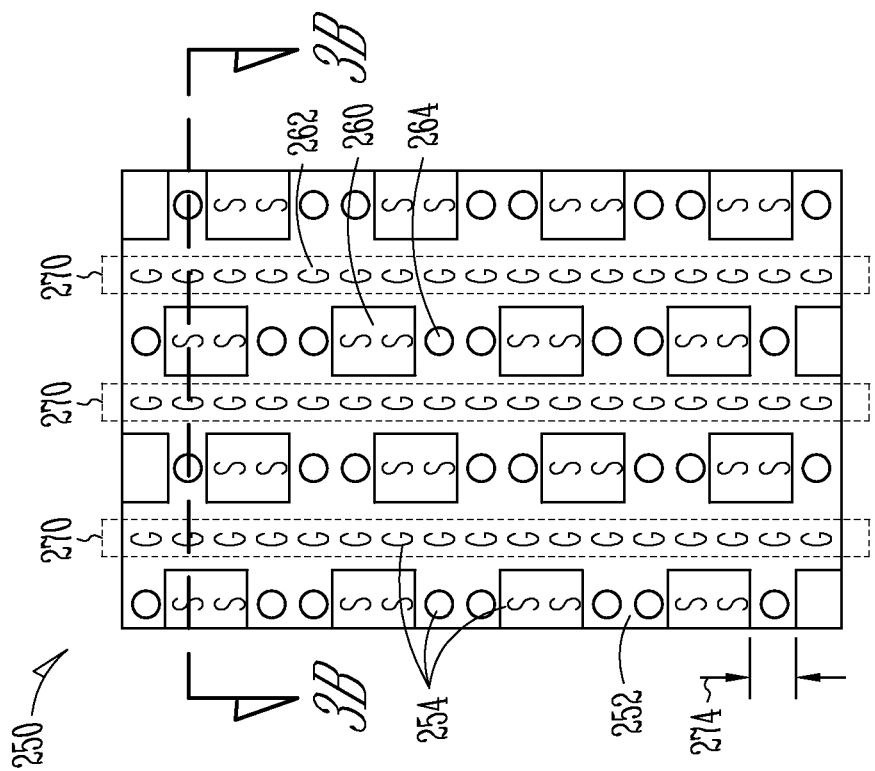
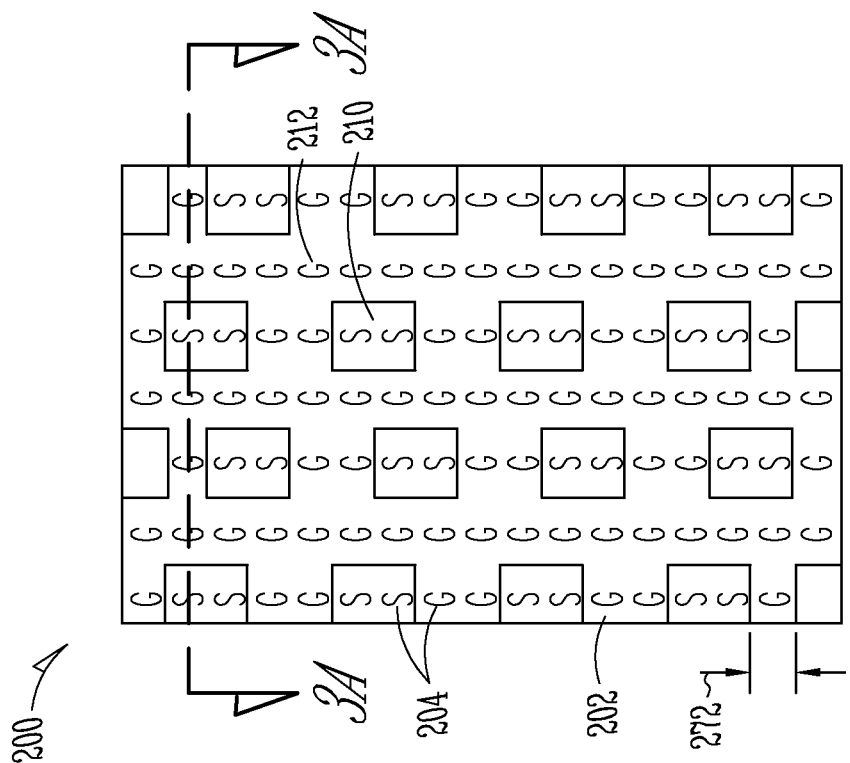
Fig. 2B
Fig. 2A

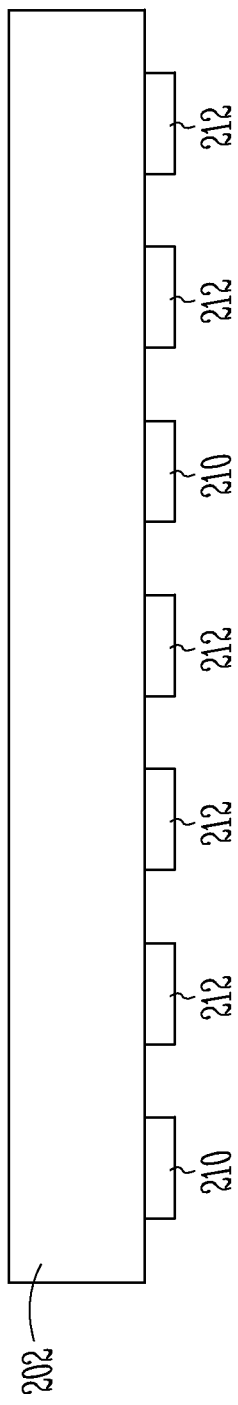
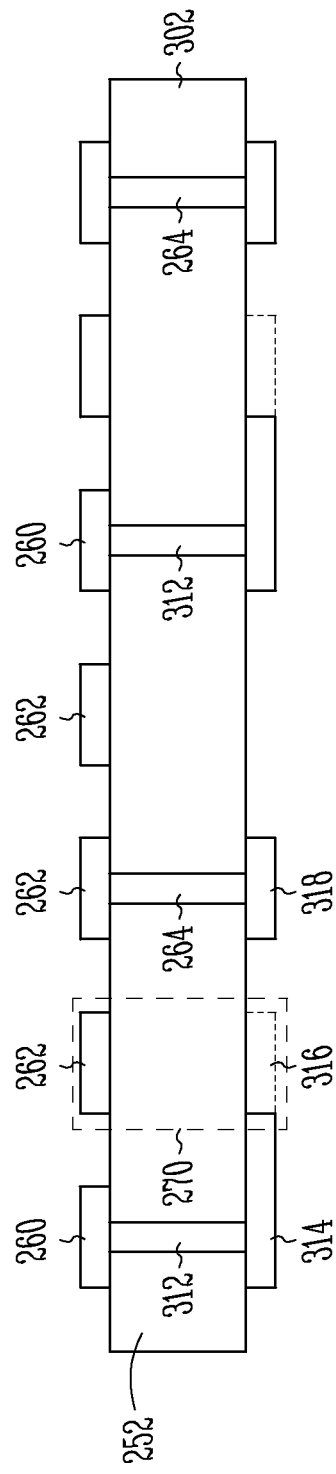

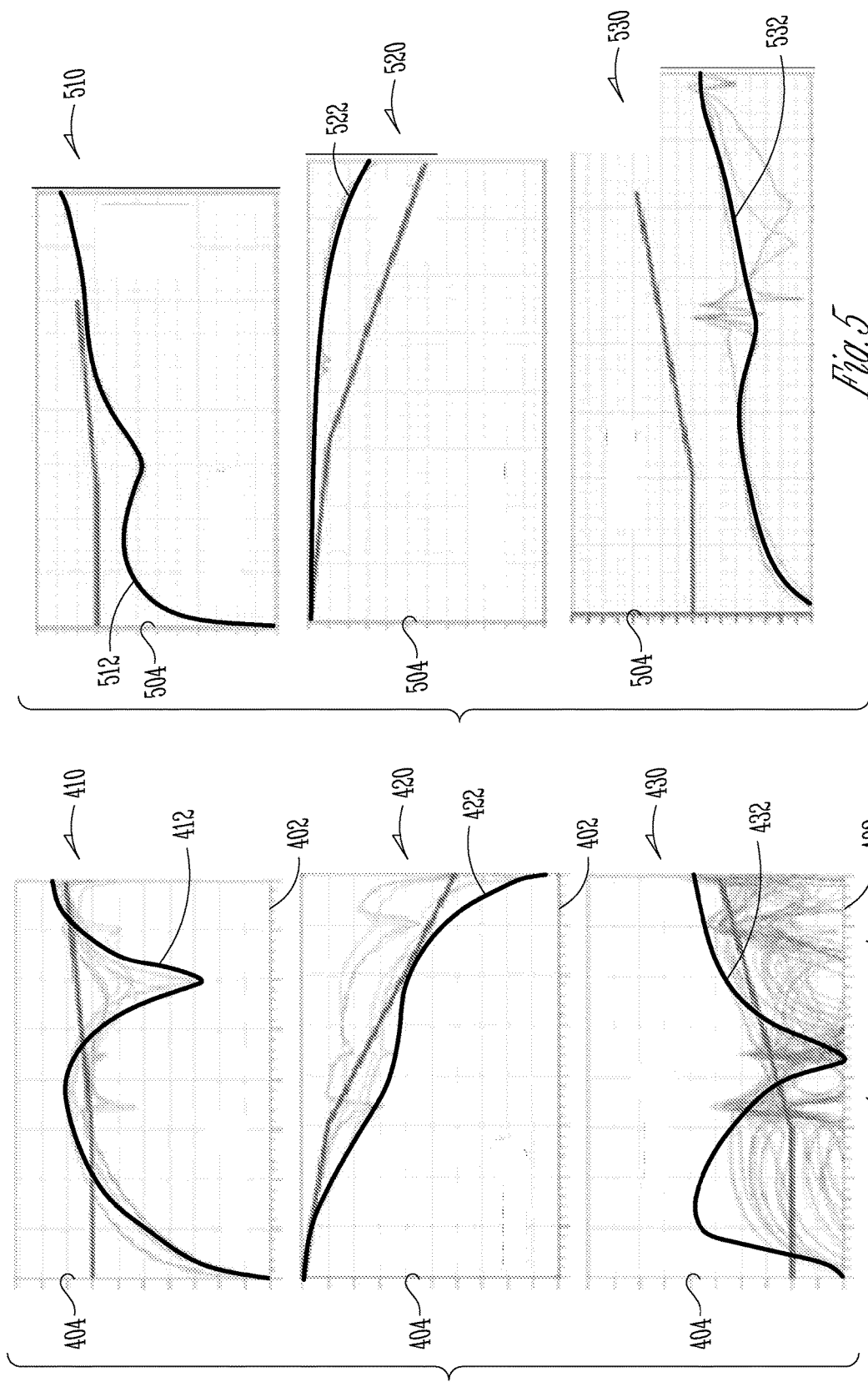

GROUND ROUTING DEVICE AND METHOD

CROSS-REFERENCE TO RELATED APPLICATION

This application is a U.S. National Stage Filing under 35 U.S.C. 371 from International Application No. PCT/US2013/076021, filed on Dec. 18, 2013, and published as WO 2015/094214 on Jun. 25, 2015, which application is incorporated herein by reference in its entirety.

TECHNICAL FIELD

Embodiments described herein generally relate to electrical interconnections in microelectronic devices.

BACKGROUND

Increasing interconnection density is one of many pressures in the electronic industry. As all components shrink in size, interconnection designs must keep pace. There is a need for very dense, high speed (30 Gb/s+) routing configurations. In addition, it is desirable to keep manufacturing costs low by continuing to use standard low cost printed circuit board (PCB) design rules. Recent and future communication standard interfaces consist of an increasing number of parallel channels while dramatically increasing the line rate per channel and decreasing the available PCB real estate at the same time. This represents a major challenge in system signal integrity. Embodiments of the present disclosure provide high channel density at a low manufacturing cost, while maintaining acceptable signal performance.

BRIEF DESCRIPTION OF THE DRAWINGS

FIG. 2A is a block diagram of a connector, in accordance with some embodiments of the invention.

FIG. 2B is a block diagram of a PCB, in accordance with some embodiments of the invention.

FIG. 3A is a cross section of the connector from FIG. 2A, in accordance with some embodiments of the invention.

FIG. 3B is a cross section of the connector from FIG. 2B, in accordance with some embodiments of the invention.

FIG. 4 shows graphs of noise versus frequency performance for prior art configurations.

FIG. 5 shows graphs of noise versus frequency performance for configurations in accordance with some embodiments of the invention.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
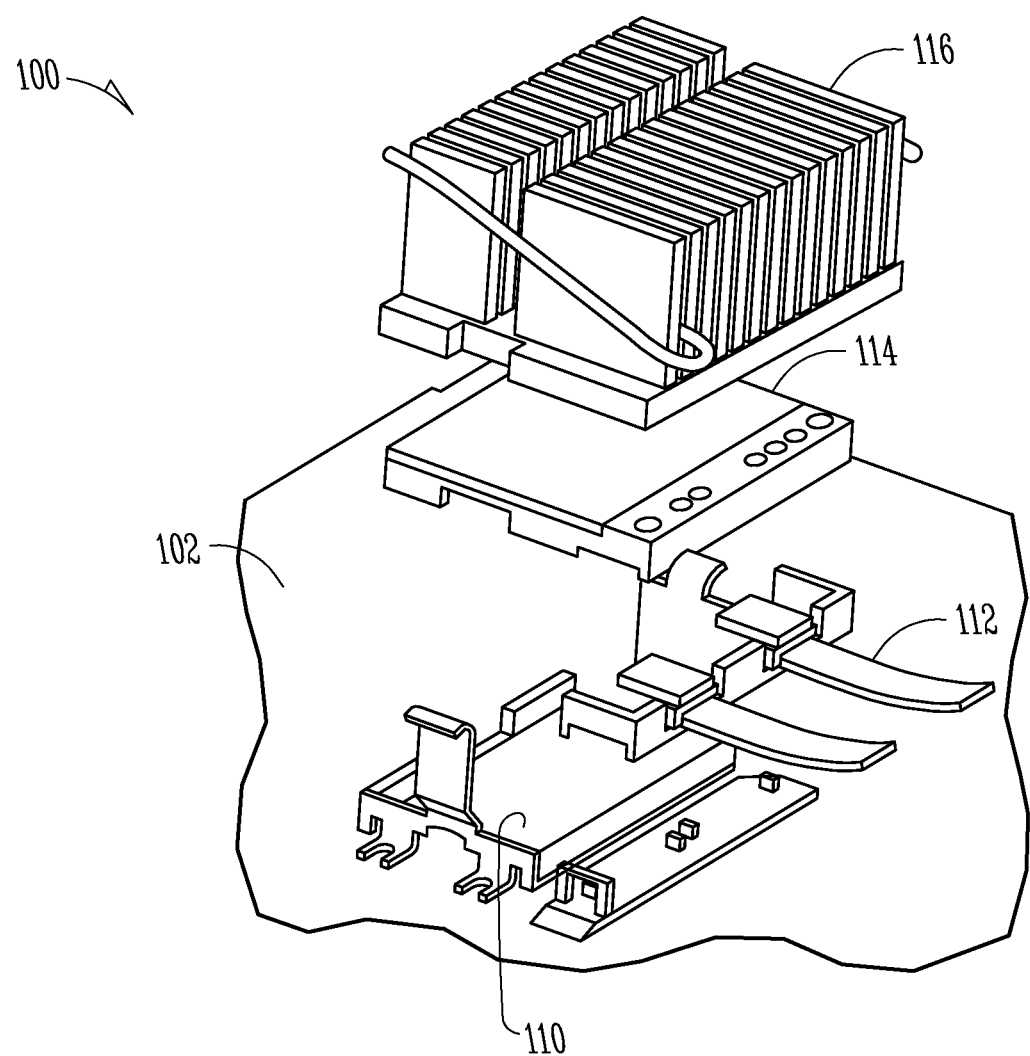
FIG. 1 is an isometric view of an electronic device, including a connector in accordance with some embodiments of the invention.

FIG. 1 shows an electronic device 100 according to one example of the invention. The electronic device 100 of FIG. 1 includes a PCB 102. In the example of FIG. 1, the PCB 102 is a motherboard. Other PCBs are also within the scope of the invention, such as an interposer, or other re-distribution substrate. The electronic device 100 is shown with a connector 110 mounted to the PCB 102. In one example the connector 110 includes a surface mount connector. The example connector 110 of FIG. 1 provides an electrical interface for a number of optical waveguides 112. An optical transceiver 114 is included to convert signals between the optical waveguides 112 and the connector 110. A heat transfer device 116 such as cooling fins are also shown in this particular example of an electronic device 100.

It can be challenging to provide low noise connections at high speed between the optical waveguides 112 and the connector 110. The challenge is especially difficult when the available area on the PCB 102 is small. In one example, the connector 110 occupies an area on the PCB 102 that is smaller than one square inch. In one particular example, a connector such as connector 110 is mounted adjacent to a networking chip (not shown). In a networking chip embodiment, it can be advantageous to have the electrical connections as short as possible between optical waveguides and the networking chip. As such, a high density low noise connector, as shown in examples of the present disclosure, is particularly advantageous in a networking chip configuration.

FIG. 2A shows a pinout of a connector 200 according to one embodiment. In one example, the connector 200 illustrates a configuration of connector 110 from FIG. 1. In one example, the connector 200 is a surface mount connector. The connector 200 includes a number of connection sites 204 housed in a base 202. In one example, multiple connection sites are coupled together electrically to function as a single element. For example, two connection sites 204 are coupled together, in the example of FIG. 2A, to form a signal site 210. In one example, a pair of coupled connection sites 204 corresponds to a differential signal pair 210. Other examples do not necessarily include multiple connection sites 204 coupled together.

In one example, the number of connection sites 204 includes a number of ground sites 212. In the example shown, each signal site 210 is substantially surrounded by a number of ground sites 212. Surrounding a signal site with ground sites may provide an electrical shielding effect that reduces crosstalk between signal transmissions when an associated electrical device is in operation. In one example, substantially surrounding a signal site with ground sites includes location of ground sites as shown in FIG. 2A. In another example, the number of ground sites 212 are further electrically connected together. In one example, a metallic layer is deposited in a substantially solid pattern covering the ground sites 212, as shown in FIG. 2A.

FIG. 2B shows a pinout of a portion of a PCB 250 according to one embodiment. Although an area of the portion of the PCB 250 is shown substantially corresponding to an area of the connector 200 from FIG. 2A, one of ordinary skill in the art will recognize that the portion of the PCB 250 shown in FIG. 2B may be only a part of a larger PCB. In one example, the PCB 250 is configured for surface mount connection. In one example, the PCB 250 is a part of PCB 102 as shown in FIG. 1.

The PCB 250 includes a number of connection sites 254 housed in a base 252. The number of connection sites 254 are adapted to correspond to the number of connection sites 204 of the connector 200 from FIG. 2A. Similar to the connector 200, in one example, multiple connection sites 254 are shown coupled together electrically to function as a single element. For example, two connection sites 254 are coupled together to form a signal site 260. In one example, a pair of coupled connection sites 254 corresponds to a differential signal pair 260. Other examples do not necessarily include multiple connection sites 254 coupled together.

Similar to the connector 200 from FIG. 2A, the number of connection sites 254 includes a number of ground sites 262. In the example shown, each signal site 260 is substantially surrounded by a number of ground sites 262. In one example, substantially surrounding a signal site 260 with ground sites 262 includes location of ground sites as shown in FIG. 2A. In one example, the number of ground sites 262 are further electrically connected together. In one example, a metallic layer is deposited in a substantially solid pattern covering the ground sites 262, as shown in FIG. 2A.

FIG. 2B also shows locations of a number of ground vias 264. As can be seen from the Figure, not all ground sites 262 include a ground via 264. In the example shown, the ground vias 264 are arranged to leave a number of columns 270 between signal sites 260 where no ground vias 264 are present. In one example, by only forming a select number of ground vias 264, an amount of PCB real estate on a back side of the PCB is available for additional routing. In the example of FIG. 2B, the arrangement of columns 270 provides available pathways for routing along the columns 270 and between the ground vias 264. Although a column arrangement is shown, one of ordinary skill in the art, having the benefit of the present disclosure, will recognize that other arrangements of ground vias 264 are possible that include real estate on a back side of the PCB is available for additional routing. Columns 270 are merely one example.

In one example the signal sites 210 of the connector 200 and the corresponding signal sites 260 of the PCB include an offset. FIG. 2A shows an offset 272, and FIG. 2B shows an offset 274. The offsets 272, 274 form a staggered array of signal sites in the connector 200 and corresponding PCB 250. By staggering the array of signal sites by offset amounts 272, 274, an increased level of noise cancellation is provided in the arrays of signal sites. The noise cancellation effect may further reduce crosstalk between adjacent signal sites in addition to the electrical shielding provided by substantially surrounding the signal sites by ground sites. In the PCB 250 the offset 274 provides improved noise cancellation, since ground vias are not populated in route columns 270.

FIG. 3A shows a cross section of the connector 200 from FIG. 2A, taken along line 3A-3A. The number of signal sites 210 and ground sites 212 are shown in their respective locations on the body 202. Although not shown in FIG. 3A, the number of signal sites 210 and ground sites 212 are electrically coupled to circuitry in associated devices, such as an optical transceiver 114 as shown in FIG. 1.

FIG. 3B shows a cross section of the PCB 250 from FIG. 2B, taken along line 3B-3B. The number of signal sites 260 and ground sites 262 are shown in their respective locations on the body 252. FIGS. 3A and 3B are shown in proximity to one another to illustrate how signal sites 210 and ground sites 212 of the connector 200 correspond to associated signal sites 260 and ground sites 262 of the PCB 250.

FIG. 3B further illustrates the number of ground vias 264 that electrically couple the ground sites 262 to one or more ground pads 318 on a backside 302 of the PCB 250. As discussed above, not all ground sites 262 include a ground via 264. FIG. 3B also shows a column 270 defined by the absence of selected ground vias 264. As discussed above, in locations where no ground vias 264 are located, real estate is available on the backside 302 of the PCB 250 for electrical routing.

In FIG. 3B, signal vias 312 are shown coupling the signal sites 260 to the backside 302 of the PCB 250. An electrical routing 314 such as a metallic trace is formed on the backside 302 of the PCB to route signals from the signal vias 312 into real estate available within the column 270. In the example shown, once the electrical routing 314 is directed to the column 270, another lateral trace 316 is formed to route signals out laterally along the PCB 250 as shown in FIGS. 3A and 3B.

In one example, by using the additional real estate provided by selective use of ground vias 264, the electrical routing 314 and lateral trace 316 may be formed with a more relaxed pitch than would be required if every connection site 204 from the connector 200 were required to have a corresponding via. Using configurations such as the examples of connectors 200 and PCBs 250, more cost effective processing methods may be used to form traces on the backside 302 of the PCB. Using configurations such as the examples of connectors 200 and PCBs 250, electric shielding of signals is provided at an acceptable level while cost of forming traces on the PCB are kept at a reduced level. In another example, the width of the lateral trace 316 can be increased due to selective used of ground vias 264. Wider traces exhibit lower signal loss than narrower traces.

FIG. 4 shows three different plots of performance versus frequency for selected routing configurations according to the prior art. The loss is shown along the y-axis 404 with respect to the signal frequency along the x-axis 402. A return loss 412 (drawn as an average of multiple simulations) in the first plot 410 shows a large magnitude at select frequencies. In the second plot 420 an insertion loss 422 (average) also shows a large loss magnitude. The third plot 430 shows a large amount of crosstalk 432 (average).

FIG. 5 shows three different plots of loss versus frequency under the same conditions as the first 410, second 420, and third 430 plots from FIG. 4, but using the routing configurations according to example embodiments described above. Similar to FIG. 4, the loss level is shown along the y-axis 504 with respect to the signal frequency along the x-axis 502. A loss level 512 (average) in the first plot 510 shows much lower magnitude of loss at select frequencies. In the second plot 520 the loss level 522 (average) also shows much lower loss at different frequencies. The third plot 530 also shows a high reduction in crosstalk 532 (average) when compared to crosstalk 430 at corresponding frequencies.

In many examples, return loss is worse in the prior art because the close proximity of ground vias makes it difficult to match the via impedance to the system trace impedance, producing a reflection. As shown in the plots of FIGS. 4 and 5, a number of performance benchmarks, such as return loss, insertion loss, and crosstalk are improved using connectors and methods as described above.

Figure 6:
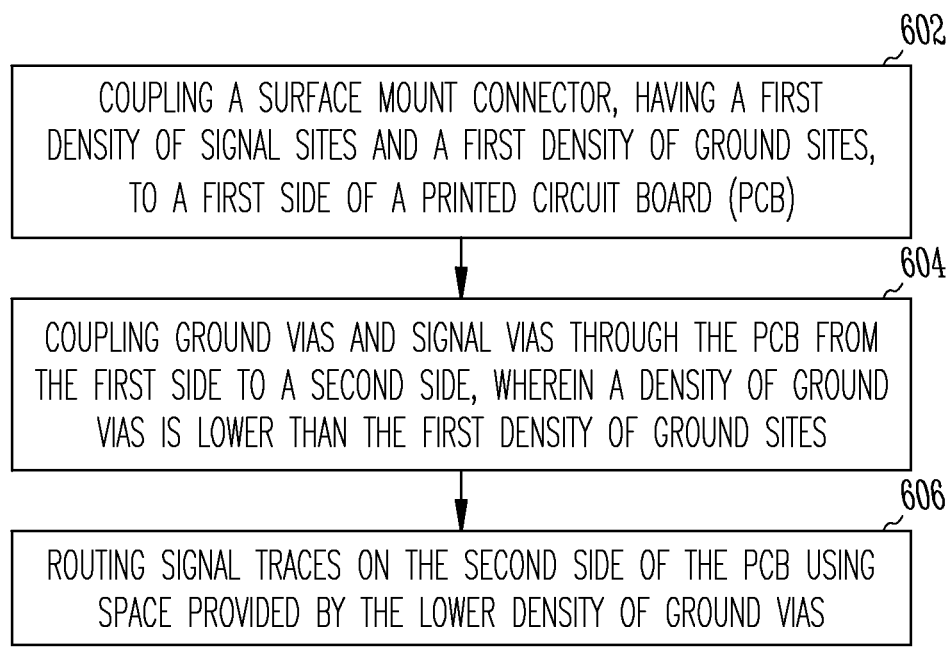
FIG. 6 shows a method of making an electronic device in accordance with some embodiments of the invention.

FIG. 6 shows an example method of making an electronic device. In operation 602, a surface mount connector is connected to a PCB. The connector has a first density of signal sites and a first density of ground sites. One example of a connector is shown in FIGS. 2A and 3A above. In operation 604, ground vias and signal vias are coupled through the PCB from the first side to a second side, wherein a density of ground vias is lower than the first density of ground sites. One example of ground vias includes ground vias 264 as shown in FIGS. 2B and 3B. In operation 606, signal traces are routed on the second side of the PCB using space provided by the lower density of ground vias. One example of signal traces includes electrical routing 314 and lateral trace 316 from FIG. 3B.

In one example, routing signal traces on the second side of the PCB includes using only low cost metallization techniques, such as lithography and metal trace formation. In one example, the pitch of the signal traces can be larger than a pitch in the connector because of the extra real estate available on the second side of the PCB as described in examples above. In one example, the signal traces can all be formed on one lithographic level, in contrast to stacking multiple traces over one another on the second side of the PCB. Stacking traces on top of one another requires a number of processing steps, in comparison to single level lithography, such as multiple masking and stripping steps, and the need to form vias between levels. Using examples of single level traces that are possible due to configurations as described above, significant cost savings in manufacturing of the PCB are realized.

Additionally, because of the extra PCB real estate available for trace forming, the traces can be formed wider. In one example wider trace forming brings larger dimensional tolerances, and as a result, better manufacturing yield.

Figure 7:
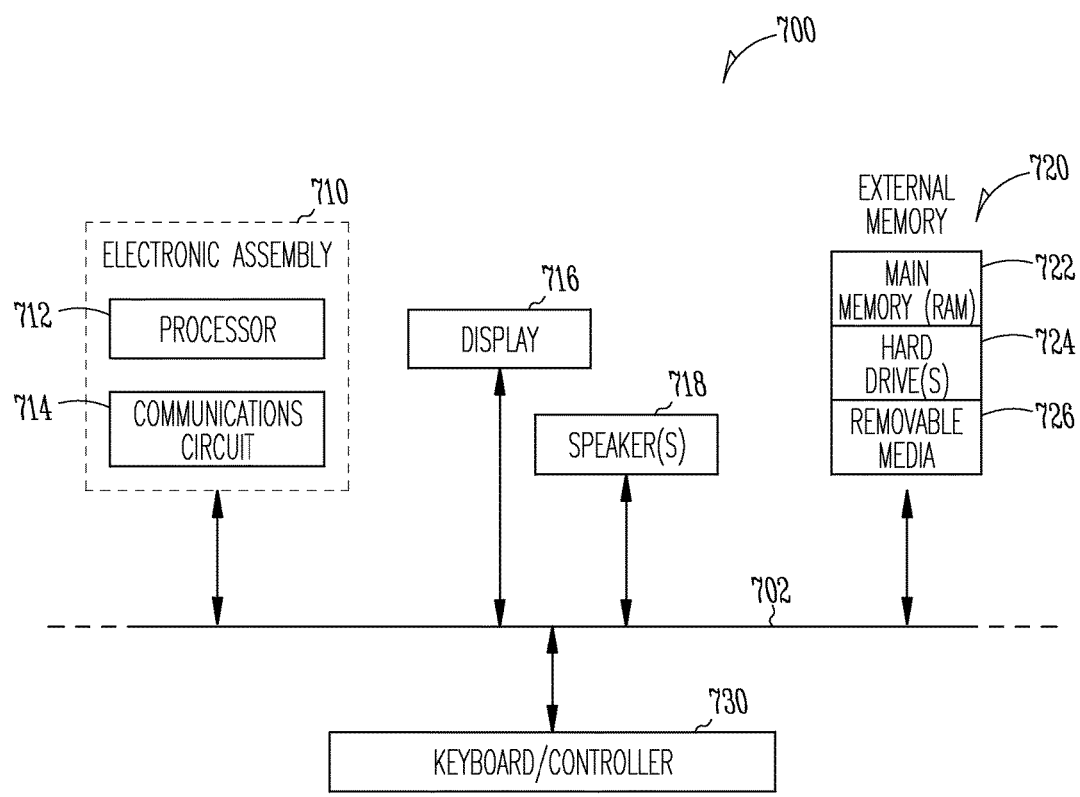
FIG. 7 is block diagram of an electronic system in accordance with some embodiments of the invention.

An example of an electronic device using connectors and PCBs as described in the present disclosure is included to show an example of a higher level device application for the present invention. FIG. 7 is a block diagram of an electronic device 700 incorporating at least one connectors and/or PCBs in accordance with at least one embodiment of the invention. Electronic device 700 is merely one example of an electronic system in which embodiments of the present invention can be used. Examples of electronic devices 700 include, but are not limited to personal computers, networking servers, tablet computers, mobile telephones, game devices, MP3 or other digital music players, etc. In this example, electronic device 700 comprises a data processing system that includes a system bus 702 to couple the various components of the system. System bus 702 provides communications links among the various components of the electronic device 700 and can be implemented as a single bus, as a combination of busses, or in any other suitable manner.

An electronic assembly 710 is coupled to system bus 702. The electronic assembly 710 can include any circuit or combination of circuits. In one embodiment, the electronic assembly 710 includes a processor 712 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 710 are a custom circuit, an application-specific integrated circuit (ASIC), or the like, such as, for example, one or more circuits (such as a communications circuit 714) for use in wireless devices like mobile telephones, tablet computers, laptop computers, two-way radios, and similar electronic systems. The IC can perform any other type of function.

The electronic device 700 can also include an external memory 720, which in turn can include one or more memory elements suitable to the particular application, such as a main memory 722 in the form of random access memory (RAM), one or more hard drives 724, and/or one or more drives that handle removable media 726 such as compact disks (CD), flash memory cards, digital video disk (DVD), and the like.

The electronic device 700 can also include a display device 716, one or more speakers 718, and a keyboard and/or controller 730, which can include a mouse, trackball, touch screen, voice-recognition device, or any other device that permits a system user to input information into and receive information from the electronic device 700.

To better illustrate the method and apparatuses disclosed herein, a non-limiting list of embodiments is provided here:

Example 1 includes a connector having a surface mount connector, including a number of connection sites, wherein the number of connection sites includes a plurality of signal sites substantially surrounded by a number of ground sites. The electronic device also includes a printed circuit board (PCB) coupled to the surface mount connector with a number of matching PCB connection sites, including a number of PCB signal sites and a number of PCB ground sites, wherein the number of PCB ground sites are coupled together on a first side of the PCB, and a number of ground vias passing through the PCB to a second side of the PCB, wherein the number of ground vias is smaller than the number of ground sites.

Example 2 includes the connector of Example 1, further including a number of signal vias coupling the PCB signal sites to the second side of the PCB, and a plurality of traces located on the second side of the PCB and coupled to the number of signal vias.

Example 3 includes the connector of any one of examples 1-2, wherein the traces pass beneath a number of PCB ground sites on the first side of the PCB.

Example 4 includes the connector of any one of examples 1-3, wherein the traces occupy substantially all of a width formed in a column beneath the number of ground sites on the first side of the PCB.

Example 5 includes the connector of any one of examples 1-4, wherein the each of the plurality of signal sites includes multiple signal pins.

Example 6 includes the connector of any one of examples 1-5, wherein each of the plurality of signal sites includes a differential signal pair.

Example 7 includes the connector of any one of examples 1-6, wherein the plurality of signal sites are arranged in a staggered array.

Example 8 includes an optoelectronic connection, including a number of optical waveguides, an optical transceiver coupled between the number of optical waveguides and a surface mount module, a number of connection sites on a bottom surface of the surface mount module, wherein the number of connection sites includes a plurality of signal sites substantially surrounded by a number of ground sites, a printed circuit board (PCB) coupled to the surface mount connector with a number of matching PCB connection sites, including a number of PCB signal sites and a number of PCB ground sites, wherein the number of PCB ground sites are coupled together on a first side of the PCB, and a number of ground vias passing through the PCB to a second side of the PCB, wherein the number of ground vias is smaller than the number of ground sites.

Example 9 includes the optoelectronic connection of Example 8, further including a networking chip coupled to the PCB adjacent to the surface mount electrical connection module.

Example 10 includes the optoelectronic connection of any one of examples 8-9, wherein the number of connection sites on the bottom surface of the surface mount module includes signal columns, and continuous ground columns located between signal columns, wherein each signal column includes a number of signal sites separated from one another by a number of ground sites.

Example 11 includes the optoelectronic connection of any one of examples 8-10, further including a number of signal vias coupling the PCB signal sites to the second side of the PCB, and a plurality of traces located on the second side of the PCB and coupled to the number of signal vias.

Example 12 includes the optoelectronic connection of any one of examples 8-11, wherein the traces pass beneath the ground columns on the first side of the PCB.

Example 13 includes the optoelectronic connection of any one of examples 8-12, wherein the plurality of signal sites includes 32 differential pair channels.

Example 14 includes the optoelectronic connection of any one of examples 8-13, wherein each channel processes approximately 32 Gb per second.

Example 15 includes the optoelectronic connection of any one of examples 8-14, wherein an area on the bottom surface of the surface mount module containing the number of connection sites is approximately one square inch.

Example 16 includes a method of making an electronic device, including coupling a surface mount connector, having a first density of signal sites and a first density of ground sites, to a first side of a printed circuit board (PCB), coupling ground vias and signal vias through the PCB from the first side to a second side, wherein a density of ground vias is lower than the first density of ground sites, and routing signal traces on the second side of the PCB using space provided by the lower density of ground vias.

Example 17 includes the method of Example 16, wherein routing signal traces includes routing using low cost metallization techniques.

Example 18 includes the method of any one of Examples 16-17, wherein routing signal traces on the second side of the PCB includes routing traces on a single lithographic processing level.

These and other examples and features of the present electronic device, solder compositions, and related methods will be set forth in part in the following detailed description. This overview is intended to provide non-limiting examples of the present subject matter—it is not intended to provide an exclusive or exhaustive explanation. The detailed description below is included to provide further information about the present molds, mold systems, and methods.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A device, comprising:
a surface mount connector, including a plurality of connection sites, wherein the plurality of connection sites includes a plurality of signal sites at least mostly surrounded by a plurality of ground sites;
a printed circuit board (PCB) coupled to the surface mount connector with a plurality of matching PCB connection sites, including a plurality of PCB signal sites and a plurality of PCB ground sites, wherein the plurality of PCB ground sites are coupled together on a first side of the PCB, wherein the surface mount connector is configured to couple an optical waveguide to the PCB; and
a plurality of ground vias passing through the PCB to a second side of the PCB, wherein the plurality of ground sites outnumber the plurality of ground vias.

2. The device of claim 1, further including a plurality of signal vias coupling the PCB signal sites to the second side of the PCB, and a plurality of traces located on the second side of the PCB and coupled to the plurality of signal vias.

3. The device of claim 2, wherein the traces pass beneath the plurality of PCB ground sites on the first side of the PCB.

4. The device of claim 3, wherein the traces occupy at least most of a width formed in a column beneath the plurality of PCB ground sites on the first side of the PCB.

5. The device of claim 1, wherein each of the plurality of signal sites includes multiple signal pins.

6. The device of claim 1, wherein each of the plurality of signal sites includes a differential signal pair.

7. The device of claim 1, wherein the plurality of signal sites are arranged in a staggered array.

8. An optoelectronic device, comprising:
a plurality of optical waveguides;
an optical transceiver coupled between the plurality of optical waveguides and a surface mount connector;
a plurality of connection sites on a bottom surface of the surface mount connector, wherein the plurality of connection sites includes a plurality of signal sites at least mostly surrounded by a plurality of ground sites;
a printed circuit board (PCB) coupled to the surface mount connector with a plurality of matching PCB connection sites, including a plurality of PCB signal sites and a plurality of PCB ground sites, wherein the plurality of PCB ground sites are coupled together on a first side of the PCB; and
a plurality of ground vias passing through the PCB to a second side of the PCB, wherein the plurality of ground sites outnumber the plurality of ground vias.

9. The optoelectronic device of claim 8, wherein the PCB is configured to be coupled to a networking chip adjacent to the surface mount electrical connector.

10. The optoelectronic device of claim 8, wherein the plurality of connection sites on the bottom surface of the surface mount connector includes signal columns, and continuous ground columns located between signal columns, wherein each signal column includes a plurality of signal sites separated from one another by a plurality of ground sites.

11. The optoelectronic device of claim 10, further including a plurality of signal vias coupling the PCB signal sites to the second side of the PCB, and a plurality of traces located on the second side of the PCB and coupled to the plurality of signal vias.

12. The optoelectronic device of claim 11, wherein the traces pass beneath the ground columns on the first side of the PCB.

13. The optoelectronic device of claim 8, wherein the plurality of signal sites includes 32 differential pair channels.

14. The optoelectronic device of claim 13, wherein each channel processes approximately 32 Gb per second.

15. The optoelectronic device of claim 14, wherein an area on the bottom surface of the surface mount connector containing the plurality of connection sites is approximately one square inch.

16. A method of making an electronic device, comprising:
coupling a surface mount connector, having a first number of signal sites and a first number of ground sites, to a first side of a printed circuit board (PCB), wherein the surface mount connector is configured to couple an optical waveguide to the PCB, wherein the signal sites are at least mostly surrounded by the ground sites;
coupling ground vias and signal vias through the PCB from the first side to a second side, wherein a number of ground vias is lower than the first number of ground sites; and
routing signal traces on the second side of the PCB using space provided by the lower number of ground vias.

17. The method of claim 16, wherein routing signal traces includes routing using lithography.

18. The method of claim 16, wherein routing signal traces on the second side of the PCB includes routing traces on a single lithographic processing level.

* * * * *